Feb. 2, 1954    R. A. McCALLUM    2,667,903
SAWING MACHINE WITH SEQUENTIALLY-OPERATED
HOLDER-GUARD AND SAW
Filed April 28, 1949    3 Sheets-Sheet 3
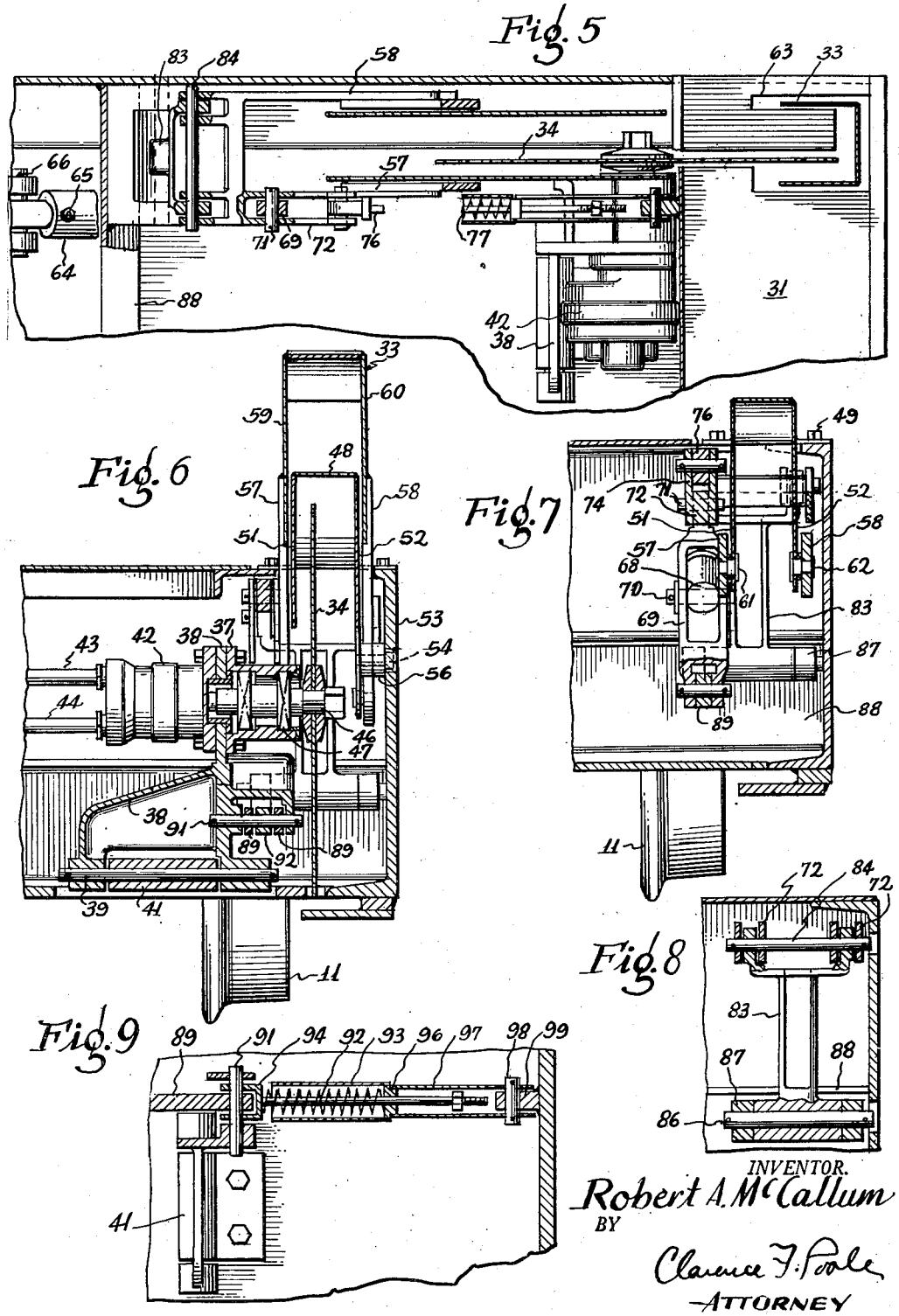

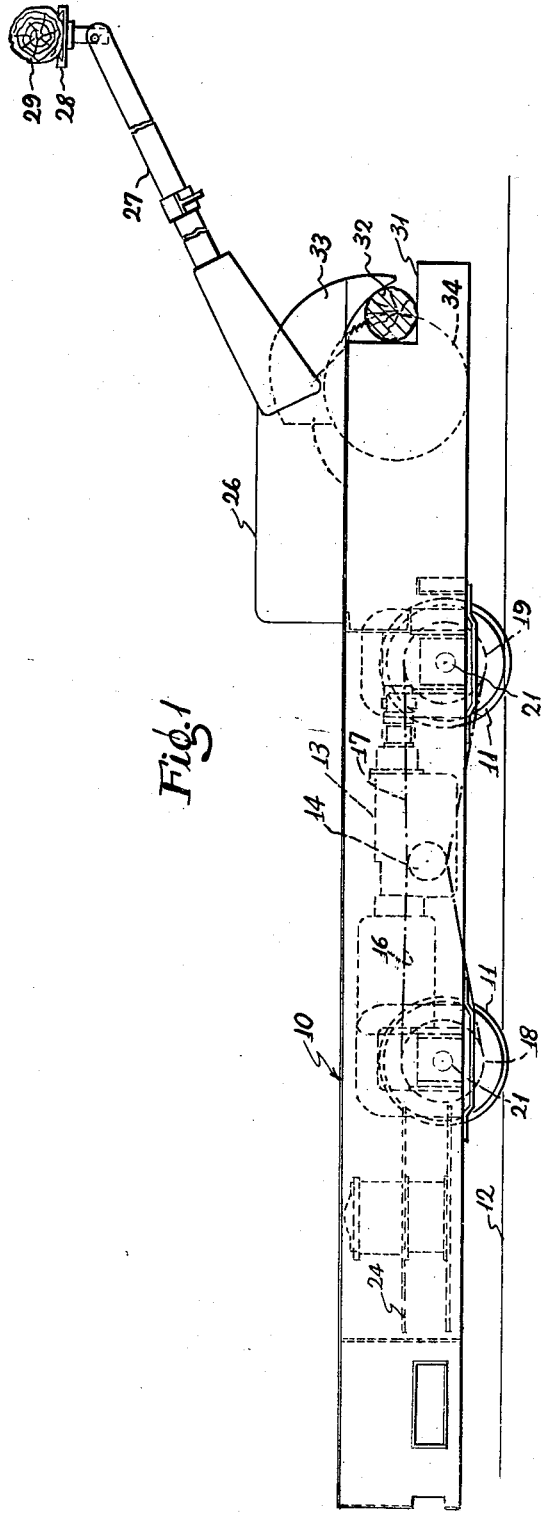
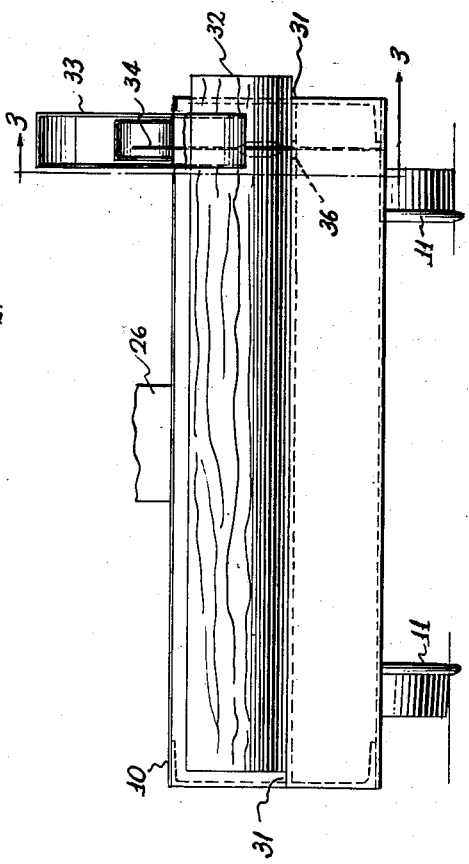

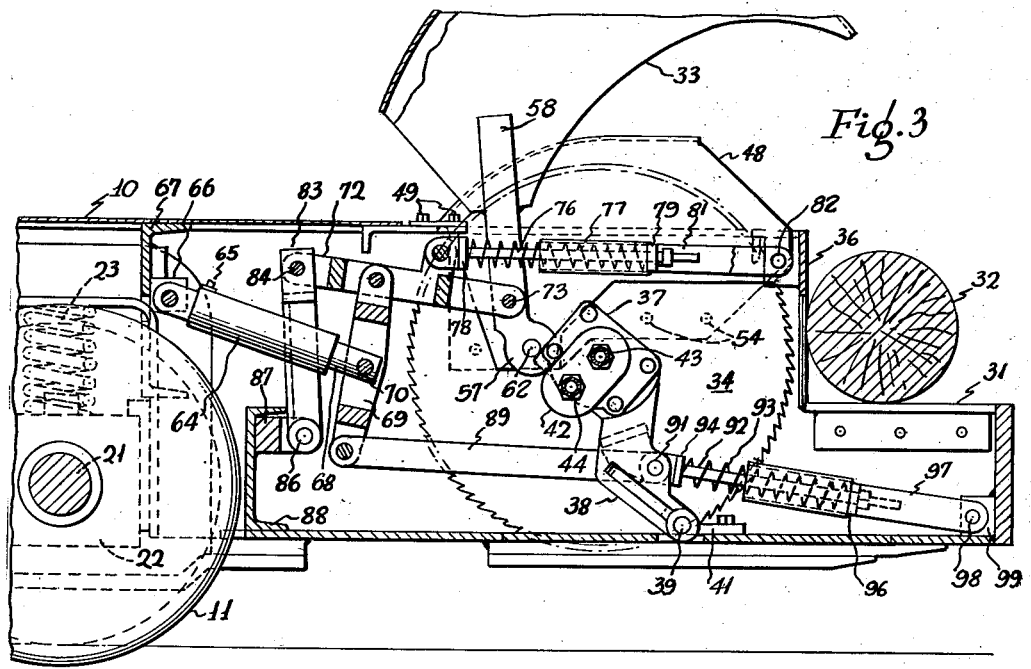
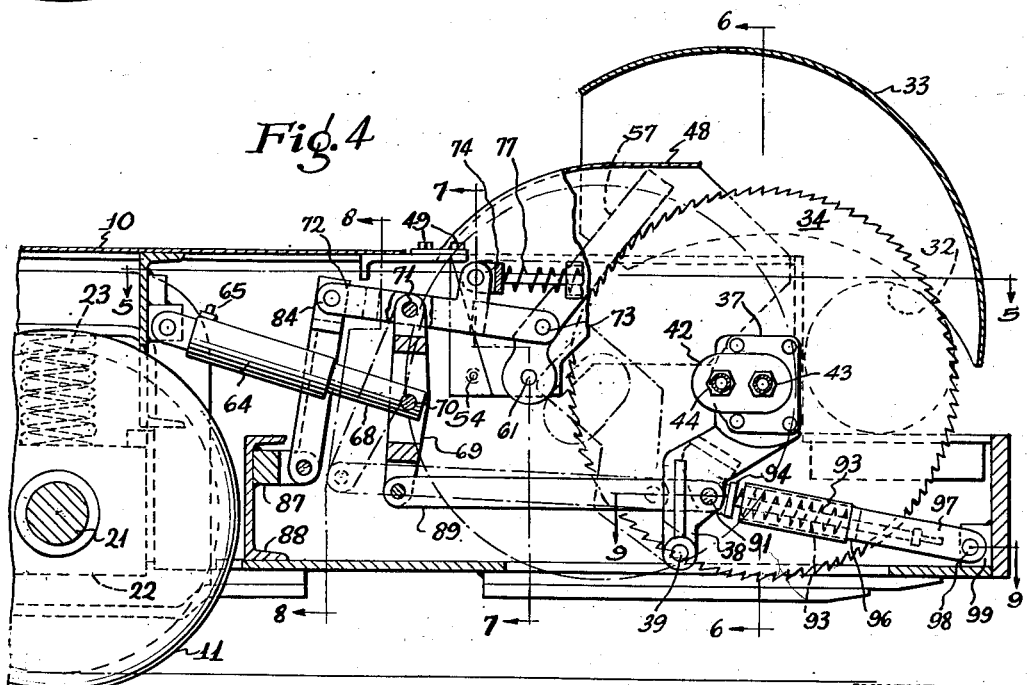

Patented Feb. 2, 1954

2,667,903

UNITED STATES PATENT OFFICE 2,667,903

SAWING MACHINE WITH SEQUENTIALLY OPERATED HOLDER-GUARD AND SAW

Robert A. McCallum, Clarendon Hills, Ill., assignor to Goodman Manufacturing Company, Chicago, Ill., a corporation of Illinois Application April 28, 1949, Serial No. 90,120

5 Claims. (Cl. 143—47)

1

This invention relates generally to vehicles for installing timbers in mines, and relates particularly to improvments in machines for sawing mine timbers to size prior to installation in a mine.

One of the principal objects of the invention is to afford a construction for a sawing machine adapted to be driven from a power take-off from the power supply of a vehicle upon which the sawing machine is mounted.

A further object is to afford a construction whereby a saw guard may be moved into position to hold a work piece prior to advancing the saw against the work piece with the guard in such holding position.

Still another object is to provide a single fluid actuated motor for performing the sequential operations of moving a saw guard into position to hold a work piece in position for sawing, and thereafter by a novel linkage to advance the saw against the work piece, a reverse set of sequential operations taking place at the conclusion of the sawing operation, so that at all times when the saw is advancing into the work or moving in any manner with respect to the work piece, the saw guard is in position for the protection of the operator.

The foregoing and other objects of the invention will be apparent from the following description and the drawings which show a preferred embodiment of the invention, and what is now considered to be the best mode of applying the principles thereof. While the invention is described in terms of an embodiment which it may assume in practice, it is not intended that the invention be limited in terms of the embodiment shown, which is by way of illustration only, nor otherwise than by the scope and breadth of the claims subjoined.

In the drawings:

Figure 1 is a side elevational view of a mine vehicle embodying the improved sawing machine according to the present invention;

Figure 2 is an end view of Figure 1 looking from the right to the left as seen in Figure 1;

Figure 3 is an enlarged longitudinal sectional view through a portion of the vehicle shown in Figure 1 looking in the direction of the arrows 3—3 of Figure 2, showing details of the arrangement of the saw and the saw guard, and the means for moving same sequentially;

Figure 4 is a view similar to Figure 3, showing the saw guard in operative position and the saw in position of completing a cut through a work piece;

2

Figure 5 is a section taken along the line 5—5 of Figure 4 looking in the direction of the arrows;

Figure 6 is a section taken along the line 6—6 of Figure 4 looking in the direction of the arrows;

Figure 7 is a section taken along line 7—7 of Figure 4 looking in the direction of the arrows;

Figure 8 is a section taken along line 8—8 of Figure 4 looking in the direction of the arrows; and Figure 9 is a view looking in the direction of the arrows 9—9 of Figure 4.

Referring now to Figures 1 and 2 of the drawings, there is shown a mine vehicle 10 having wheels 11 adapted to move on a trackway 12. The mine vehicle 10 is driven by an electric motor 13, power being supplied to the wheels 11 through a driving sprocket 14 around which are trained driving chains 16 and 17 which respectively engage sprockets 18 and 19 on the axles 21 of the wheels 11. The axles 21, see Figures 3 and 4, are mounted in floating journals 22, and the car 10 is supported on springs 23 resting upon the journals 22.

The vehicle 10 may be supplied with power from any convenient source, but in the embodiment shown is provided with a cable reel 24 which is adapted to have wound thereon or payed off therefrom a cable, not shown, connected to a source of electric power.

The forward end of the vehicle is provided with a housing 26 containing mechanism for controlling the movement of a boom 27 which is provided with a claw 28 at the end thereof for holding a mine prop or beam 29 in position.

The forward end of the vehicle 10 is also provided with a work table 31 to support a mine timber or work piece 32 which is adapted to be held in position by a saw guard 33, the work piece 32 being adapted to be cut into convenient lengths by means of a saw 34 adapted to move thereagainst. As seen in Figure 2, the saw 34 moves in a slot 36 provided in the work support 31.

Referring now to Figures 3 and 6, the saw 34 is mounted for rotation in a journal 37 mounted at the end of an arm 38 connected by means of a pin 39 to a block 41 for pivotal movement with respect thereto. The arm 38 provides a support for a fluid motor 42 supplied with motive fluid by conduits 43 and 44. The fluid motor 42 turns a shaft 46 supported in bearings 47 within the journal 37, the end of the shaft 46 supporting the saw 34 for rotation therewith.

A fixed guard 48 is secured to the top deck of the mine vehicle 10 by means of fastening bolts 49. The saw guard 48 also includes sides 51 and 52, the side 52 being held to a side plate 53 of the vehicle 10 by means of a plurality of bolts 54 and spacer members 56, see also Figures 6 and 7.

The saw guard 33 is secured to a pair of arms 57, 58 which straddle sides 59, 60 of the guard 33 and welded thereto. The arms 57 and 58 are supported for pivotal movement with the guard 33 upon pins 61 and 62 mounted respectively in the depending sides 51 and 52 of the fixed guard 48.

Means are provided for advancing the saw guard 33 into position to hold the work piece 32 to the table 31, the sides 59 and 60 being adapted to bear against the work piece 32. In order to hold pieces of relatively small cross sectional dimension, the work table 31 is provided with an essentially U-shaped opening 63, see Fig. 5, into which the sides 59 and 60 and the top of the guard 33 may extend. As shown with particular reference to Figures 3 and 4, there is provided a fluid actuating cylinder 64 which is pivotally connected to a bracket 66 on a cross member 67 of the vehicle 10. The fluid actuating cylinder 64 is connected to a fluid pressure conduit 65 and has a piston 68 movable therein which is pivotally connected at 70 to a force transmitting lever providing the linkage 69. The linkage 69 is pivotally connected as at 71, see also Figure 5, to an operator 72 which is connected to the arms 57 and 58 at 73. The operator 72 is provided with a lug 74 which is connected to a rod 76 which is encircled by a spring 77. One end of the spring 77 abuts a stop 78 formed on the rod 76, the other end of the spring 77 abutting a stop 79 formed in a spring guide 81 which is mounted pivotally at 82 on the vehicle 10.

A link 83 is provided for supporting the operator 72 and is pivotally connected to the operator 72 at 84, the other end of the link 83 being pivotally connected at 86 to a support 87 mounted on a cross frame member 88 of the vehicle 10.

The linkage 69 is also pivotally connected to a second operator 89, the other end of the operator 89 being connected to a pin 91 extending from the arm 38 supporting the fluid motor 42 and the saw 34. A guide 92 is also connected to the pin 91 and is encircled by a spring 93 which bottoms against a collar 94 formed on the guide 92, the other end of the spring 93 abutting a stop 96 formed in a spring guide 97 which is pivotally connected by a pin 98 to an abutment 99 supported on the frame of the vehicle 10, see also Figure 9.

In operation, when fluid is applied to the piston 68 of the fluid cylinder 64, the operator 72 will be moved by the linkage 69 to rock the guard 33 against the pre-load on spring 77 into position to engage the work piece 32. The pre-load of the spring 77 is less than the pre-load of the spring 93, the operator 89 and the spring 93 thereby forming an abutment for the linkage 69 in advancing the operator 72 against the pre-load of the spring 77. When the saw guard 33 has moved about the pivots 61 and 62 to engage the work piece 32, an abutment is provided whereby the operator 82 is advanced by the further movement of the piston 68 against the load in the spring 93. As the operator 89 is advanced by the piston 68 and the linkage 69, the arm 38 moves about the block 41 on the pin 39 to advance the saw 34 in the slot 36, see also Figure 2, against the work piece 32, motive fluid being supplied to the fluid motor 42 by the fluid conduits 43 and 44, the piston 68 continuing to advance the saw 34 while the work piece is being held by the saw guard 33.

When the pressure fluid behind the piston 68 is released, the force in the spring 93 moves the operator 89 to the left, with the operator 72 and the guard 33 forming an abutment for the linkage 69 to rock the arm 38 in a counterclockwise direction as seen in Figure 4 to move the saw 34 out of engagement with the work piece 32. Thereafter, when the arm 38 together with the saw 34 has moved to the position as seen in Figure 3, the load in the spring 77 will then move the operator 72 to the position as seen in Figure 3, to raise the saw guard out of engagement with the work piece 32.

It will be seen from the foregoing description that in the operation of the improved sawing machine according to the present invention the saw guard and the saw are sequentially moved, the saw guard being first moved into position to hold a work piece and the saw then being advanced against the work piece, the sawing operation taking place only when the saw guard is in position to protect the operator. It will also be seen from the foregoing description that the saw is removed from the work piece only before the saw guard is disengaged from the work piece, thereby insuring protection of the operator at all times.

While the invention has been described in terms of a preferred embodiment which it will assume in practice, it is not intended that the invention be limited in terms of the embodiment shown, nor otherwise than by the terms of the appended claims.

I claim:

1. In a sawing machine, a work support, a saw guard adapted to move into position to hold a work piece against said work support, a saw adapted to advance against said work piece while said work piece is held by said guard, means for moving said guard and said saw in sequence comprising a first operator for moving said guard into position, a second operator for advancing said saw against said work piece after said guard is in position to hold said work piece, a linkage connected at one end to said first operator and connected at its other end to said second operator, a power operated actuator connected to said linkage at a point intermediate the ends thereof, a spring for opposing the movement of said first operator, a second spring for opposing the movement of said second operator, the preload of said second spring being greater than the preload of said first spring for determining the movement of said guard and said saw in sequential order upon operation of said actuator.

2. In a sawing machine, a work support, a saw guard adapted to move into position to hold a work piece against said work support, a saw adapted to advance against said work piece while said work piece is held by said guard, means for moving said guard and said saw in sequence comprising a first operator for moving said guard into position, a second operator for advancing said saw against said work piece after said guard is in position to hold said work piece, a linkage connected at one end to said first operator and connected at its other end to said second operator, a power operated actuator connected to said linkage at a point intermediate the ends thereof, a spring for opposing the movement of said first operator, a second spring for opposing the movement of said second operator, the preload of said second spring being greater than the preload of said first spring, said power operated actuator being adapted to move said first operator and said guard against the force of said first spring into position to hold said work piece, and being adapted upon further operation thereof to move said second operator and said saw against the force of said second spring to advance said saw against said work piece.

3. In a sawing machine, a work support, a saw guard adapted to move into position to hold a work piece against said work support, a saw adapted to advance against said work piece while said work piece is held by said guard, means for moving said guard and said saw in sequence comprising a first operator for moving said guard into position, a second operator for advancing said saw against said work piece after said guard is in position to hold said work piece, a linkage connected at one end to said first operator and connected at its other end to said second operator, a power operated actuator connected to said linkage at a point intermediate the ends thereof, a spring for opposing the movement of said first operator, a second spring for opposing the movement of said second operator, the preload of said second spring being greater than the preload of said first spring, said power operated actuator being adapted to move said first operator and said guard against the force of said first operator into position to hold said work piece, said second operator and said second spring forming an abutment for said other end of said linkage during movement of said first operator, and said power operated actuator being adapted thereafter to move said second operator with said saw against the force of said second spring with said first operator and said guard forming an abutment for the said one end of said linkage during the movement of said second operator and said saw against said work piece.

4. In a sawing machine, a work support, a saw guard adapted to move into position to hold a work piece against said work support, a saw adapted to advance against said work piece while said work piece is held by said guard, means for moving said guard and said saw in the order named comprising a first operator for moving said guard into position, a second operator for advancing said saw against said work piece after said guard is in position holding said work piece, a force transmitting lever connecting said operators, a power operated actuator connected to said force transmitting lever, and a spring biasing said second operator in a direction to oppose movement of the saw against the work piece and for determining the movement of said guard and said saw in sequential order upon operation of said actuator.

5. In a sawing machine, a work support, a saw guard adapted to move into position to hold a work piece against said work support, a saw adapted to advance against said work piece while said work piece is held by said guard, means for moving said guard and said saw in sequence comprising a first operator for moving said guard into position, a second operator for advancing said saw against said work piece after said guard is in position to hold said work piece, a force transmitting lever connected at one end to said first operator and connected at its other end to said second operator, a power operated actuator connected to said lever at a point intermediate the ends thereof, and means biasing the second operator in a direction to oppose movement of the saw against the work piece for determining the movement of said guard and said saw in sequential order upon operation of said actuator.

ROBERT A. McCALLUM.

References Cited in the file of this patent
UNITED STATES PATENTS

| Number | Name | Date |
|---|---|---|
| 1,411,045 | Leaver | Mar. 28, 1922 |
| 1,670,946 | Wolf | May 22, 1928 |
| 2,144,335 | Jensen et al. | Jan. 17, 1939 |
| 2,365,987 | Zimmerman | Dec. 26, 1944 |